Jan. 21, 1930.  T. H. PHILLIPS  1,744,672
HAND TRUCK
Filed March 12, 1928  2 Sheets-Sheet 1

Inventor
T. H. Phillips,
By Clarence A. O'Brien
Attorney

Jan. 21, 1930.　　　T. H. PHILLIPS　　　1,744,672
HAND TRUCK
Filed March 12, 1928　　2 Sheets-Sheet 2

Inventor
T. H. Phillips,
By Clarence A. O'Brien
Attorney

Patented Jan. 21, 1930

1,744,672

UNITED STATES PATENT OFFICE

THOMAS H. PHILLIPS, OF RICHMOND, INDIANA, ASSIGNOR OF ONE-HALF TO HENRY W. BECK, OF RICHMOND, INDIANA

HAND TRUCK

Application filed March 12, 1928. Serial No. 261,155.

The present invention relates to hand operated trucks and has for its principal object to provide a device of this character adapted for moving relatively heavy objects, such as stoves, wall safes, barrels and crates, and similar articles which are ordinarily too heavy for movement by means of the average hand trucks.

A further object of the invention is to provide rollers at the front and rear ends of the truck with the forwardly arranged roller adapted for vertical adjustment so that the roller may be raised out of contact with the surface over which the truck is being moved in order that the frame may rest upon the ground, and prevent it from movement while the truck is being loaded or unloaded.

A still further object is to provide a truck frame of a right angle formation having a roller mounted at the outer corner of the angular portion of the frame, with the outer end of each angularly disposed section of the frame also provided with rollers whereby to enable either end of the frame to be disposed in horizontal position with respect to the ground for trucking operation.

Another object of the invention is to provide a foldable handle for one end of the frame, adapted to be folded against the frame when the end of the frame provided with the handle is arranged in trucking position.

A still further object of the invention is to provide a device of this character of a simple and practical construction, which is strong and durable, easy and convenient to manipulate, relatively inexpensive to manufacture, and otherwise well adapted to the purposes for which the same is designed.

Other objects and advantages reside in the special construction and combination of the various elements comprising the invention, reference being had to the accompanying drawings, forming a part hereof, wherein.

Figure 1:
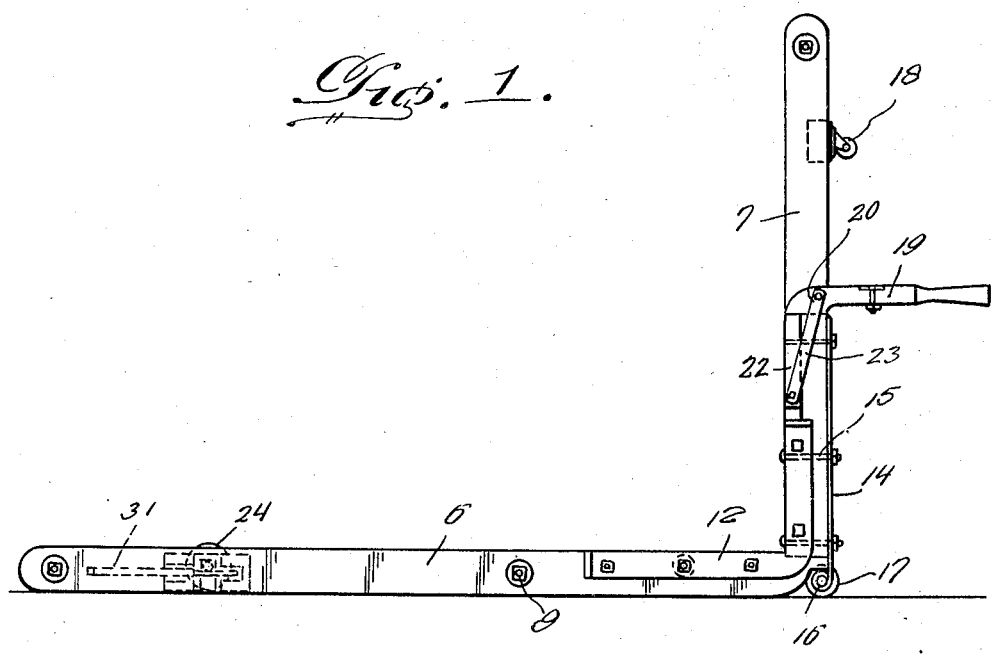
Figure 1 is a side elevational view.
Figure 2:
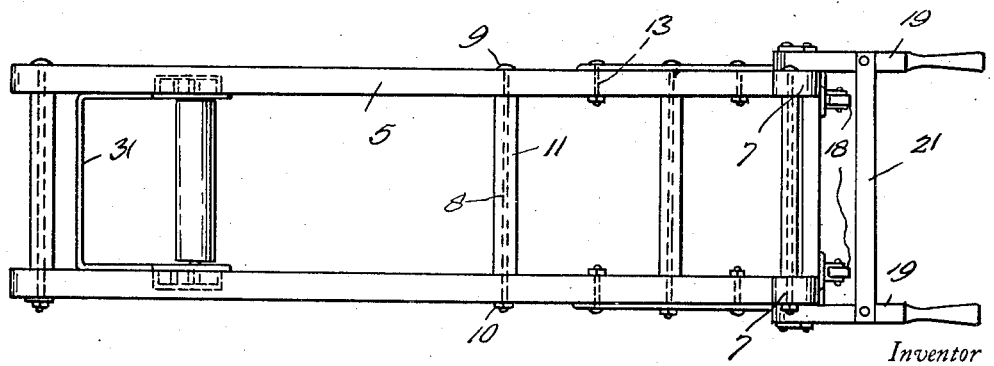
Figure 2 is a top plan view.
Figure 3:
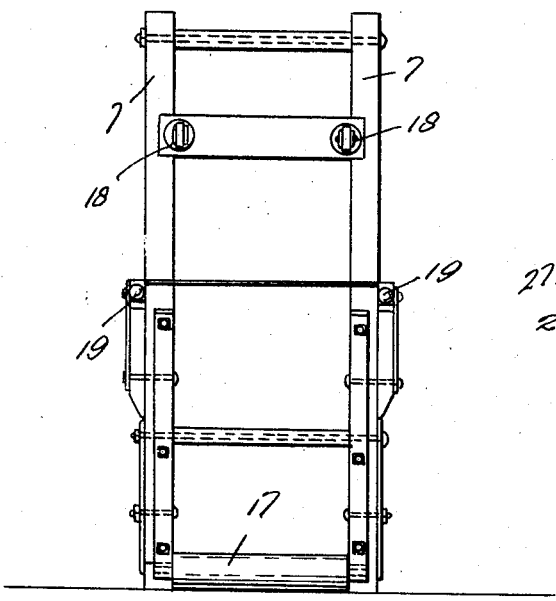
Figure 3 is a rear elevational view.

Referring now to the drawings in detail, the invention comprises a hand truck composed of an angular truck frame 5 composed of a pair of spaced parallel frame members having their opposite ends disposed at right angles to each other, as indicated at 6 and 7 respectively in Figure 1 of the drawings. At spaced intervals throughout the frame, transverse braces 8 are provided, comprising rods 9 extending through the side of the frame members and secured in position with respect thereto by nut 10, each of the rods having a tubular sleeve 11 carried thereon with their opposite ends engaging the respective frame members whereby to maintain the same in spaced relation.

At the corner of each of the frame members is arranged an angular brace 12, secured to the frame by bolts 13, whereby to maintain the ends 6 and 7 of the frame in a position at right angles with respect to each other.

Along the outer edge of each end 7 of the truck and adjacent its connection with the end 6 thereof is arranged a roller supporting plate 14, preferably constructed of scrap iron secured to the frame by bolts 15, and with one end thereof formed into a bearing support 16, disposed at the outer corner of the frame, the supports 16 disposed at the respective sides of the frame providing a mounting for the opposite ends of a roller 17.

The roller 17 is of a sufficient diameter to enable its surface to be arranged at a horizontal plane with the lower edge of the end 6 of the frame, when such end of the truck is disposed in horizontal position, and also adapted to support the inner end of the opposite section of the truck slightly above the surface of the ground when such end is horizontally disposed.

Adjacent the outer end of the section 7 of the frame is arranged a pair of roller casters 18 adapted to support the section 7 of the frame for rolling the same upon the ground when disposed in a horizontal position. Intermediate the ends of the section 7 of the frame is arranged a folding handle 19, each frame member being provided with one of the handles having their inner ends pivotally attached to the frame as at 20 and connected to each other by a bar 21.

When arranged outwardly with respect to the frame, the inner ends of the handles are adapted to rest upon one end of a support 22, secured to the outer edge of the truck frame, said handles also being provided with a brace 23, connected at its opposite ends to the pivot pins 20 and the supports 22. The support 22 is sufficiently narrow to enable the handles to rest against the outer side of the truck frame, when arranged in folded position so as not to interfere with the movement of the truck over the ground when the end 7 is disposed in a horizontal position.

Adjacent the outer ends of the sections 6 of the truck frame is a roller 24 disposed transversely between the frame members, said roller having shaft ends 25 extending therefrom, and rotatably supported in substantially square shaped bearing blocks 26. The blocks 26 at the opposite ends of the roller are carried within a recess plate 27, the recess 28 within the plate being vertically disposed and separated into upper and lower compartments by a horizontally disposed plunger 29 slidably mounted in said plate. One end of the plunger 29 is engaged by a coil spring 30, adapted to normally retain the plunger in a position forming a partition between the upper and lower compartments of the recess 28 and the plunger at each side of the frame is engaged by one end of a U-shaped operating handle 31, adapted through its actuation to slidably move each of the plungers, whereby to permit the bearing block 26 within each plate to be moved into an upper or lower position within its associated recess 28, as desired.

Figure 6:
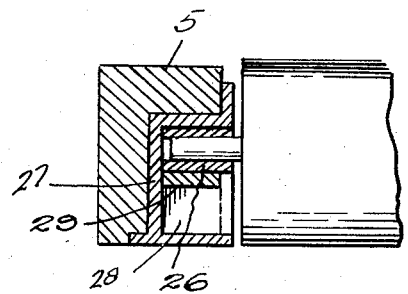
Figure 6 is a transverse sectional view therethrough, showing the removable support for the ends of the roller for rotatably supporting the same in adjusted positions.
Figure 4:
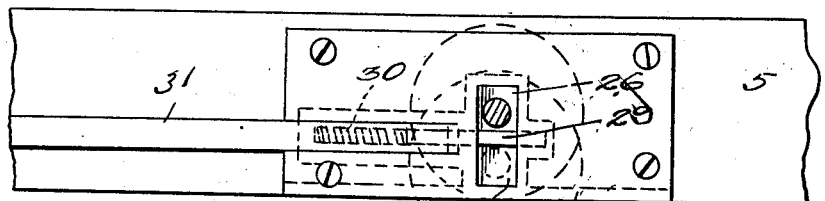
Figure 4 is a view in elevation of one of the adjustable mounting plates for the adjustable roller.
Figure 5:
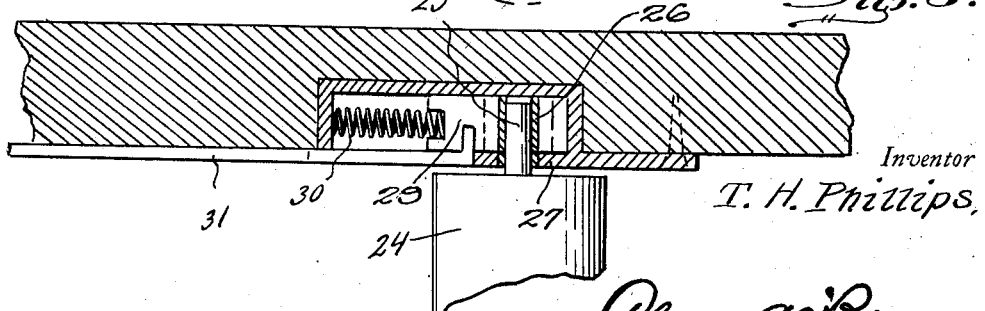
Figure 5 is a longitudinal sectional view through the roller supporting plate.

As clearly illustrated in Figures 4 and 6 of the drawings, when the bearing block 26 is disposed above the plunger 29, the lower surface of the roller 24 is disposed in a horizontal plane with the lower edge of the frame member so that the frame may then rest upon the ground, to prevent the movement of the truck during the loading or unloading thereof.

Upon the movement of the bearing block beneath the plunger 29, the lower surface of the roller will be disposed beneath the plane of the lower edge of the frame and thus serve to support the frame in rolling position.

From the foregoing, it will be apparent that either end of the truck may be disposed in a horizontal position for supporting the load, the casters 18 and the roller 24 providing means for rolling the respective ends of the truck along the ground.

It is obvious from the foregoing that the invention is susceptible of various changes and modifications, without departing from the spirit or scope of the invention or sacrificing any of its advantages, and I accordingly claim all such forms of the device to which I am entitled.

Having thus described my invention, what I claim as new is:

A hand truck comprising a frame composed of spaced parallel frame members, an adjustable roller rotatably mounted at one end of said frame, casters fixedly mounted adjacent the other end thereof, a bearing block for each end of the roller, a supporting plate for each of said blocks attached to the inner face of each of said frame members, each of said plates having a vertically disposed recess formed therein for receiving said block, a plunger slidably carried by each of said plates and normally disposed transversely of its associated recess, whereby to form the same into upper and lower compartments for selectively receiving said block, spring means normally retaining said plunger inwardly of the recess and a U-shaped handle arranged with its ends attached to said plungers for moving the same out of the recesses whereby to permit the vertical movement of the block for rotatably supporting the same in vertically adjusted position with respect to the truck frame.

In testimony whereof I affix my signature.

THOMAS H. PHILLIPS.